July 1, 1969 J. P. FOLEY 3,452,465

TELEPHONE INDEX DEVICES

Original Filed Sept. 27, 1965

INVENTOR.
JAMES P. FOLEY
BY
Ward, Haselton, McElhannon, Orme, Brooks & Fitzpatrick
ATTORNEYS 3,452,465

TELEPHONE INDEX DEVICES

James P. Foley, 748 Forest Ave.,
Larchmont, N.Y. 10538

Continuation of abandoned application Ser. No. 490,580, Sept. 27, 1965. This application Mar. 28, 1967, Ser. No. 638,169
The portion of the term of the patent subsequent to Apr. 5, 1983, has been disclaimed
Int. Cl. G09f 3/62, 3/20
U.S. Cl. 40—336 5 Claims

ABSTRACT OF THE DISCLOSURE

Telephone index devices including a flat frame member designed to fit under a telephone and having flat attachment tabs pivotally connected to the sides thereof. The tab tips are tapered to move around obstructions while permitting the frame member to remain stationary.

This is a continuation of U.S. patent application Ser. No. 490,580, filed Sept. 27, 1965, now abandoned, which in turn is a continuation-in-part of U.S. patent application Ser. No. 304,775, filed Aug. 27, 1963, now U.S. Patent 3,243,908.

This invention relates to improvements in telephone number filing devices of the type which may be attached to the underside of cradle-type telephones.

In my above identified application there is described a telephone index device which may be made easily and inexpensively of sheet plastic material. The device consists of a flat frame member which fits up against the underside of a telephone base. A sheet plastic slide member is suspended from the frame member and secured thereto for sliding movement into and out from the space between the four short legs of the telephone. The slide member is adapted to carry various index sheets which contain or which are adapted to contain information regarding frequently called numbers.

A particular feature of the above described telephone indexing device lies in the use of flexible plastic tabs which extend out from the sides of the frame member and which are specially configured to be bent upwardly and forced between the outer cover and the base member of the telephone. These plastic tabs have barbed tips; and because of the fact that the plastic outer cover of the telephone is resiliently flexible, these barbed tips are held by the cover over the edges of the base member thus to secure the frame member in place.

The invention of the present application is directed to improvements to the protruding tabs of the prior application. The arrangement of the present invention makes use of flexible tab elements which, as before, protrude outwardly from the frame member and bent upwardly to enter itno the space between the telephone base and cover. The tabs of the present invention, however, are not integral with the frame member but instead are pivotally connected to it. This arrangement permits the tabs to be rotated in under the frame member for shipment thus effecting considerable savings in space and cost of transportation. The tabs, when rotated in under the frame member, lie parallel to the slide member and take up no more space in the vertical direction than the slide member.

According to a further feature of the present invention, the tabs are tapered at their tips to enable them to be guided around the strengthening ribs which extend down along the inside of the telephone cover and block certain portions of the space between the cover and base of the telephone. The resultant pivoting of the tab elements will then be accommodated by their above described pivotal connection to the frame member.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figures 1, 2, 3:
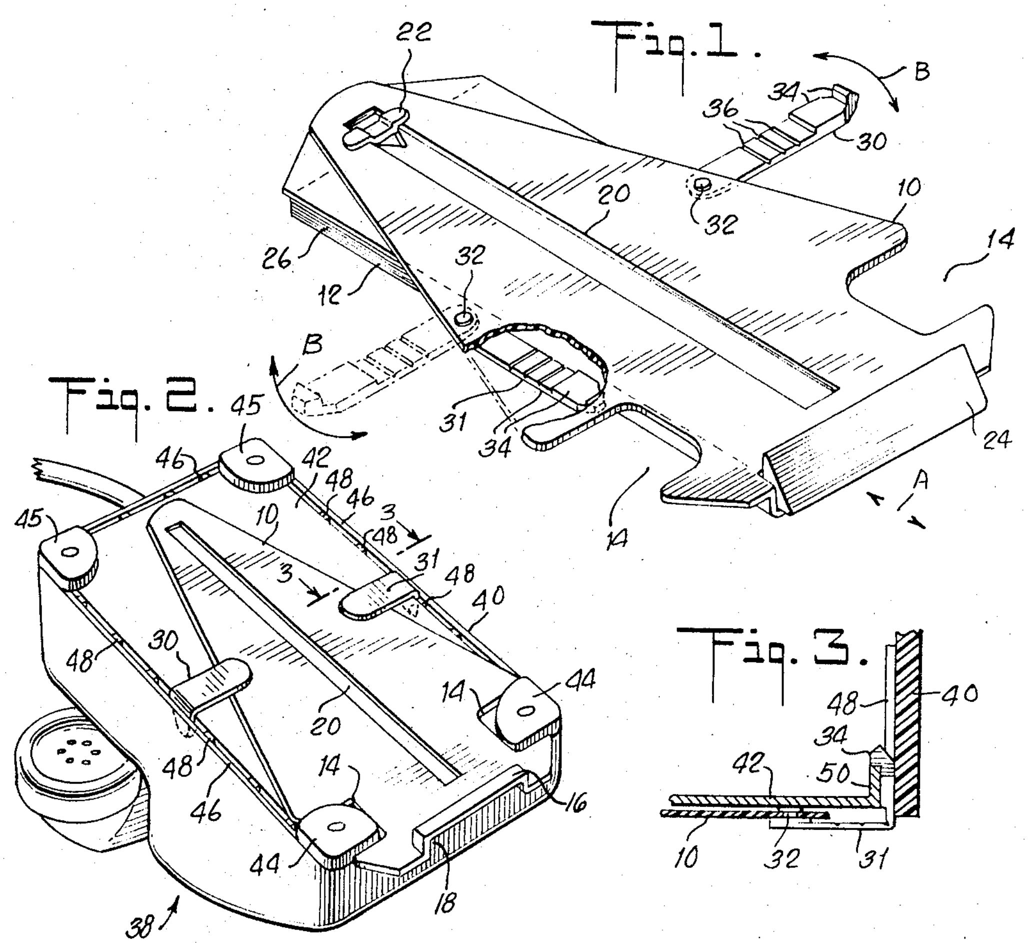
FIG. 1 is a perspective view illustrating a telephone indexing device which embodies the present invention.
FIG. 2 is a perspective view of the underside of a telephone having attached thereto the frame member of the telephone index device of FIG. 1.
FIG. 3 is a fragmentary section view taken along lines 3—3 of FIG. 2.

The telephone index device of FIG. 1 comprises a generally flat frame member 10 formed of sheet material, such as plastic, and adapted to support a slide member 12 for longitudinal sliding movement in the direction indicated by the arrow A. The frame member 10 is formed with a pair of cut-out portions 14 near its forward edge. These cut-out portions accommodate the front legs of a telephone to which the frame member is attached. The frame member 10, as can be seen in FIG. 2, is also formed with a depressed forward portion 16 which defines a transverse slot 18 through which the slide member 12 extends; and which further defines a shelf upon which the slide member 12 is supported. There is also provided a longitudinal slot 20 which extends centrally along the frame member 10 and through which a pair of guiding flanges 22 from the rear end of the slide member 12 extend. This provides support for the rear end of the slide member and allows it to be guided in its movements along the frame member 10.

The slide member 12 itself is formed from sheet plastic material. The guide flanges 22 extend upwardly from the rear of the slide member and protrude through the slot 20 in the frame member. The forward end of the slide member 12, which protrudes out through the transverse slot 18, is bent upwardly and then downwardly to form a handle portion 24. A stack of index sheets 26 rest upon the slide member 12 between the handle portion 24 and the guiding flanges 22. These index sheets carry or are adapted to carry telephone number information; and as the slide member 12 is pulled out from the frame member, these sheets and the information on them becomes exposed for convenient reference.

A pair of tab like attachment elements 30 and 31 are secured to opposite sides respectively of the frame member 10. These attachment elements are generally flat and of elongated configuration; and like the frame member 10 and the slide member 12, they are of flexible plastic material. Pivotal connecting means 32 are provided for securing the attachment elements 30 and 31 to the frame member 10. These pivotal connecting means allow the attachment elements to rotate in the direction of the arrows B so that they may either extend directly outwardly from the edge of the frame member, as illustrated by the element 30, or they may be rotated to extend alongside the slide member 12, as illustrated by the element 31. When the attachment elements are rotated to the position of the element 31, the outer dimensions of the overall device are considerably diminished so that it may be packaged far more efficiently and economically. Moreover, since the thickness of the attachment elements is no greater than that of the slide member 12 and the index sheets 26, their pivoting to a position alongside the slide member does not affect the overall thickness of the device.

The outer ends of the attachment elements are formed with steps 34 constituting an increased thickness for wedging between the resilient plastic outer cover of a telephone and the metal base element of the telephone. A plurality of groove lines 36 are formed across the attachment elements to facilitate bending up of their stepped outer ends so that they can be wedged into the underside of a telephone.

FIG. 2 illustrates the frame member 10 as secured by the attachment elements 30 and 31 to the underside of a telephone 38. The telephone 38 is shown in inverted position and may be seen to include an outer resilient plastic cover piece 40 extending over and around a flat metal base element 42. There are provided a pair of short front legs 44 attached to the forward corners of the base element 42 and a pair of short back legs 45 attached to the rear corners of the base element 42. The cover piece 40 extends slightly beyond the base element 42 to define narrow elongated slots 46 into which the stepped outer ends 34 of the attachment elements 30 and 31 extend. The slots 46 are periodically interrupted by strengthening ribs 48 which are formed along the inside surface of the cover piece 40 and which extend inwardly to the base element 42.

When the frame member 10 is attached to the telephone 38, the cut-out portions 14 of the frame member extend about the front legs 44 of the telephone so that the slide member 12 may be pulled out from the front of the telephone. At the same time, the tab like attachment elements 30 and 31 extend outwardly from the edges of the frame member and are bent about the groove lines 36 so that their stepped outer ends enter into and wedge within the narrow slots 46 of the telephone. This serves to secure the frame member 10 under the telephone in a position such that the slide member 12 may be supported for convenient sliding movement in and out from under the telephone.

FIG. 3 illustrates the manner in which the attachment elements are secured in place within the slots 46 of the telephone. It will be noted that the base element 42 is bent up about its periphery to form a flange 50 parallel to the outer cover piece 40. The stepped outer end 34 of the attachment element 31 wedges into the slot 46 and, by virtue of the resilient action of the cover piece, the attachment element is forced over the upper edge of the flange 50 so that it is effectively hooked to the base element 42.

Figure 4:
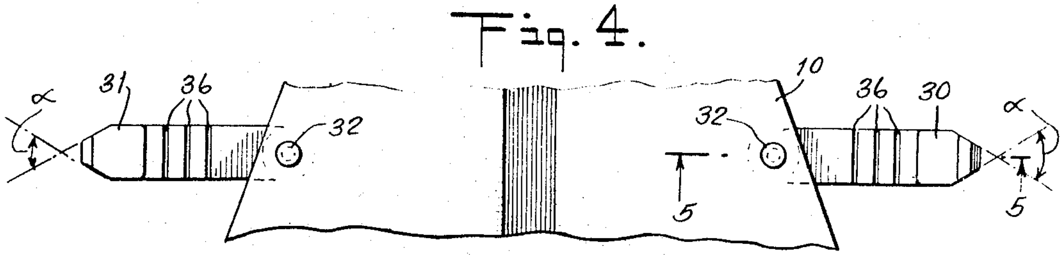
FIG. 4 is a fragmentary plan view showing an enlarged portion of the frame member of the index device of FIG. 1.

Turning now to FIG. 4, it will be seen that the stepped outer ends 34 of the attachment elements 30 and 31 are tapered as illustrated by the angle $\alpha$. The significance of this taper lies in the fact that it serves to guide the attachment elements around any strengthening ribs 48 which may lie close to where the attachment elements are to enter into the telephone. An important feature of this invention lies in the cooperative action between the tapered angle $\alpha$ and the pivotal connections 32. The angle $\alpha$ serves to turn the attachment elements 30 and 31 and guide them around the strengthening ribs 48 while the pivotal connections 32 serve to accommodate this rotative motion.

Figure 5:
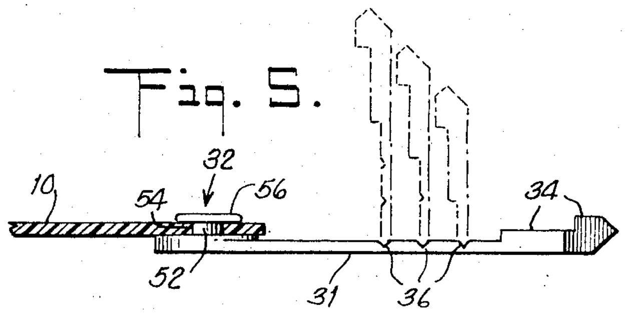
FIG. 5 is a section view taken along lines 5—5 of FIG. 4.

The formation of the pivotal connections 32 is best illustrated in FIG. 5. As shown in this drawing, the inner ends of the attachment elements are provided with integral stub like projections 52 which protrude upwardly through holes 54 in the frame member 10. The top of these stub like projections are then enlarged as at 56 in the manner of a rivet head. Since the entire structure of the device is plastic, this enlargement is achieved simply by hot pressing on the stub like projections 52.

Also as shown in FIG. 5, there may be provided various groove lines 36 and a plurality of steps 34 to accommodate telephone base elements of different widths and peripheral flanges of different heights.

It will be appreciated that there has been described a structure which is very easily and economically constructed. Only flat flexible materials are required and there is no need for spring type clips and other projecting elements which require expensive machinery and which present formidable packaging problems.

Having thus described my invention with particular reference to the preferred form thereof, it will be obvious to those skilled in the art to which the invention pertains after understanding my invention, that various changes and modifications may be made therein without departing from the spirit and scope of my invention, as defined by the claims appended thereto.

What is claimed as new and desired to be secured by Letters Patent is:

1. In an index arrangement for use with telephones of the type having a base member and a flexible resilient cover piece which extends down over and around the periphery of the base member to form narrow slots therebetween, the combination comprising a generally flat frame member constructed to support index sheet carrying means under said telephone and at least one tab like attachment element, said tab like attachment element being of flexible plastic material in generally flat elongated configuration and having a stub like projection extending upwardly from near one end, said stub like projection protruding through a hole in said frame member and enlarged on the other side of said hole in rivet fashion to secure said tab like attachment element to said frame member in a manner permitting it to pivot between a first position lying wholly against said frame member and a second position extending outwardly from the edge of said frame member, said tab like attachment element being bendable upwardly when in said second position and configured to be wedged into the slots between said telephone cover piece and base member for securing said frame member thereto.

2. In an index device for use with telephones of the type having a base and a flexible resilient cover piece which extends down over and around the periphery of the base to form narrow slots therebetween, the combination comprising a generally flat frame member constructed to support index sheet carrying means under said telephone and at least one tab-like attachment member, said tab-like attachment member being of flexible plastic material in generally flat elongated configuration, pivotal interconnecting means securing one end of said attachment element to said frame member, said interconnecting means comprising an upwardly extending stub-like projection, said stub-like projection protruding through a hole in one of said members and enlarged on the other side of said hole in rivet fashion, said stub-like projection being secured to the other member in a manner permitting the attachment member to pivot between a first position lying wholly against said frame member and a second position extending outwardly from the edge of said frame member, said tab-like attachment element being bendable upwardly when in said second position and configured to be wedged into the slots between said telephone cover piece and said base for securing said frame member thereto.

3. An index arrangement as in claim 2 wherein said tab-like attachment members are of flexible plastic material.

4. An index arrangement as in claim 2 wherein said tab-like attachment members are bendable about preselected grooved bend lines.

5. An index arrangement as in claim 2 wherein the tips of said tab-like attachment elements are tapered to guide said elements around any strenghtening ribs which cause blockage of certain regions of said narrow slots.

References Cited

UNITED STATES PATENTS

| | | | |
|---|---|---|---|
| 1,308,372 | 7/1919 | Rockwell. | |
| 2,112,474 | 3/1938 | Warren | 46—31 XR |
| 2,432,760 | 12/1947 | Higbee | 40—336 XR |
| 2,592,066 | 4/1952 | Pratt | 281—11 |
| 2,990,639 | 7/1961 | Van Gieson | 40—336 |
| 3,243,908 | 4/1966 | Foley | 40—336 |

LAWRENCE CHARLES, *Primary Examiner.*